United States Patent [19]

Field et al.

[11] Patent Number: 6,018,764
[45] Date of Patent: Jan. 25, 2000

[54] MAPPING UNIFORM RESOURCE LOCATORS TO BROADCAST ADDRESSES IN A TELEVISION SIGNAL

[75] Inventors: Michael Field; Mark K. Eyer, both of San Diego, Calif.

[73] Assignee: General Instrument Corporation, Horsham, Pa.

[21] Appl. No.: 08/762,865

[22] Filed: Dec. 10, 1996

[51] Int. Cl.⁷ .................................................. G06F 13/00
[52] U.S. Cl. ............................................. 709/217; 348/10
[58] Field of Search ............................. 348/10, 461, 462, 348/463, 464, 465, 466, 467, 468; 345/3.1, 3.2, 6.1, 6.2; 455/6.2, 6.3; 364/514; 395/200.48; 709/217

[56] References Cited

U.S. PATENT DOCUMENTS

| | | | |
|---|---|---|---|
| 5,418,782 | 5/1995 | Wasilewski | 370/486 |
| 5,517,250 | 5/1996 | Hoogenboom et al. | 348/845.1 |
| 5,734,589 | 3/1998 | Kostreski et al. | 345/327 |
| 5,761,606 | 6/1998 | Wolzien | 455/6.2 |
| 5,774,660 | 6/1998 | Brendel et al. | 709/201 |
| 5,774,664 | 6/1998 | Hidary et al. | 709/218 |
| 5,774,666 | 6/1998 | Portuesi | 395/200.48 |
| 5,778,181 | 7/1998 | Hidary et al. | 709/218 |
| 5,832,223 | 11/1998 | Hara et al. | 709/217 |

FOREIGN PATENT DOCUMENTS 0 854 650   7/1998   European Pat. Off. .

OTHER PUBLICATIONS

Moll, Gerhard, "Service–Informationen (SI) Für DVB–Systeme," *Fernseh–Und Kino–Technik*, Apr., 1996, pp. 163–171.

"Verknuepfung Von TV Mit Internet", *Funkschau*, vol. 68, No. 18, Aug. 16, 1996, pp. 70–71.

*Primary Examiner*—Moustafa M. Meky
*Attorney, Agent, or Firm*—Barry R. Lipsitz; Ralph F. Hoppin

[57] ABSTRACT

Web pages and other Internet information resources are retrieved from a one-way broadcast signal such as a broadcast television signal. A user selects from a range of available information, including hypertext markup language (HTML) pages, which is carried in the broadcast stream by invoking a command which is defined according to a uniform resource locator (URL) format. Table mapping data is carried in the broadcast signal and provides a broadcast address corresponding to the URL of the user request signal for use in identifying a location in the broadcast signal from which the desired information can be retrieved. The broadcast address may provide information regarding a frequency, packet identifier, satellite, transponder, cryptographic scheme, modulation scheme, data rate, error correction scheme, page number or other relevant criteria associated with the broadcast signal which must be known to retrieve the requested information. The system has the look and feel of a two-way Internet connection, and is compatible with existing transmission schemes.

69 Claims, 3 Drawing Sheets

MAPPING UNIFORM RESOURCE LOCATORS TO BROADCAST ADDRESSES IN A TELEVISION SIGNAL

BACKGROUND OF THE INVENTION

The present invention relates to an apparatus and method for providing information resources, such as those that are available over the Internet, via a broadcast channel. In particular, Uniform Resource Locators (URL) which identify the information resources are mapped to broadcast addresses which identify where the information resources are carried in a one-way broadcast television signal or the like. Although the system provides only one-way communication from the information provider, it has the look and feel of a bi-directional Internet connection.

Recently, an information network known as the "Internet" has become increasingly popular. The Internet provides a vast amount of information which may be accessed by users via computers for business, educational, and entertainment purposes. In particular, the Internet includes a large collection of interconnected documents which are stored in computers all over the world in a system known as the World Wide Web (i.e., the Web). The documents are organized into web spaces, where a web space includes a home page and links to other documents which may be in the local web space or in an external web space. Such links are known as hyperlinks. Documents may include moving images, text, graphical displays, and sound.

Internet resources are typically accessed in a two-way environment via a network connection. For example, connectivity to the network may be via a conventional twisted-pair telephone line which has a relatively low data-carrying capacity (e.g., bandwidth), or via a higher bandwidth path, which may comprise optical fiber and/or coaxial cable. To retrieve data from a network destination (e.g., an Internet site), a user sends a message to the network destination to request the transfer of information to the user's computer. The network destination typically includes a computer server known as a "nameserver."

Figure 1:
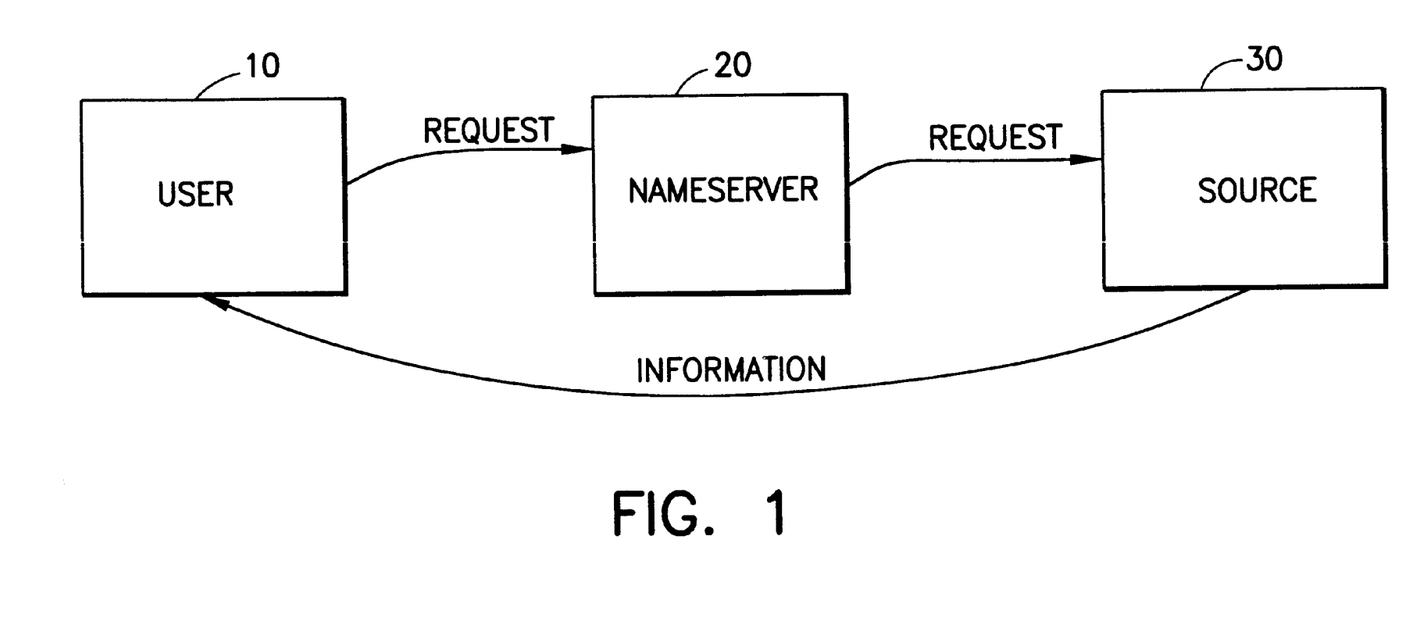
FIG. 1 is a schematic diagram of a prior art process for enabling a user to request information through a nameserver.

FIG. 1 is a schematic diagram of a prior art process for enabling a user to request information through a nameserver. A user 10 sends a request signal to the nameserver 20. The nameserver 20 then sends a request signal to a source function 30, which may be a memory which is coupled to the server. The source function 30 includes the user-requested information which may comprise, for example, text, graphics, audio and/or video data. In response to the request signal from the nameserver 20, the source function 30 provides the requested information to the user 10. As discussed below, a user can communicate with the nameserver and the rest of the network via a number of protocols.

Source information which is stored in the source function 30 is often stored in a format known as "Hypertext Markup Language (HTML)". This file or script format allows the display of text, graphics and audio information, and provides links to other pages of information through "hyperlinks." Hyperlinks are strings of characters in a particular format that specify the address of the desired page of information.

In particular, HTML is a system for marking documents to indicate how the document should be displayed, and how various documents should be linked together. HTML is a form of Standard Generalized Markup Language (SGML), defined by the International Standards Organization (ISO), reference number ISO 8879:1986. HTML specifies the grammar and syntax of markup tags which are inserted into a data file to define how the data will be presented when read by a computer program known as a "browser". The data file, which is typically stored on a Web server, includes one or more Web pages which are visited by users who have computers which may run different browsers. When a page is visited, HTML data is downloaded to a user's computer. The computer's browser processes the data to format a layout for the page so the page can be viewed by the user on a computer screen. Generally, HTML tags provide text formatting, hypertext links to other pages, and links to sound and picture elements. HTML tags also define input fields for interactive Web pages.

Hypertext is so-named because it allows a user to access different pages in different orders using hyperlinks, rather than in a predetermined, linear manner. Moreover, a particular hypertext application known as "hypermedia" includes elements other than text, such as images, video, and audio. HTML can specify links to multimedia objects. Links in an HTML hypertext page usually appear as highlighted text which is known as the anchor of the link. Moreover, an image, such as an icon, can be an anchor which is activated, for example, by the user clicking on the icon using a mouse or other pointing device. Furthermore, images known as image maps can include a number of regions which are themselves individual anchors.

An HTML application is made available to users on the Web by storing the HTML file in a directory that is accessible to a server. Such a server is typically a Web server which conforms to a web browser-supported protocol known as Hypertext Transfer Protocol (HTTP). Servers that conform to other protocols such as the File Transfer Protocol (FTP) or GOPHER may also be used but do not support interactive HTML files.

HTTP defines a set of rules that servers and browsers follow when communicating with each other. Typically, the process begins when a user clicks on an icon in an HTML page which is the anchor of a hyperlink, or the user types in a Uniform Resource Locator (URL), described below. A connection is then made to the server at the address and port number specified by the URL. Next, the browser sends a request to retrieve an object from the server, or to post data to an object on the server. The server sends a response to the browser including a status code and the response data. The connection between the browser and server is then closed.

The URL is a unique address which identifies virtually all files and resources on the Internet. A URL has the form:

method://server:port/path/file#anchor.

The "method" of accessing the resource is the web browser-supported protocol, and may include, for example, HTTP, FTP, GOPHER, TELNET, NEWS, or MAILTO. The "server:port" indicates the name of the server which is providing the resource, and is alternatively known as the Internet domain name. For example, many companies will use their company name as part of the server field. The port designation is the port number on the server, but is usually not used since a default port is assumed. The "path" indicates the directory path to the resource. The file indicates the file name of the resource. The "anchor" indicates the named element in the HTML document. Not all fields are required.

For example, consider the following URL:

http://www.company.com/news/june.html.

The access method is HTTP, the server is www.company.com, there is no port specified, the path is news, the file is june.html, and there is no anchor. Examples of FTP, GOPHER, TELNET, NEWS, and MAILTO URLs are, respectively:

ftp://ftp.uu.net/doc/literary/obi/World.Factobook;

gopher://gopher.micro.umn.edu/;

telnet://compuserve.com/;

news:alt.cows.moo; and mailto:president@whitehouse.gov.

Further information on URL formats may be found in an Internet document known as "Request for Comment (RFC) 1738" by T. Berners-Lee et al.

Thus, it can be seen that web browsers operate in a two-way communication environment to access information by sending a request signal defined by a URL command to a server, and receiving information in return. However, in a broadcast signal such as a television broadcast signal or the like, the communication is generally one-way, so there is no communication path to carry a user request signal. That is, in a broadcast environment, for example, including satellite, multiple microwave distribution systems (MMDS), terrestrial, and most cable transmissions, there is no mechanism to carry information from the user to the server (e.g., broadcaster).

Nevertheless, in view of the rapidly increasing use of Web pages and other Internet resources, it would be advantageous to provide a system for allowing users to access such resources via a broadcast data stream. The system should allow a user to select from a range of information which is carried in the broadcast stream by invoking a command which is defined according to a standard URL format. Furthermore, the system should be compatible to the extent possible with existing transmission and receiving equipment including set-top decoders and the like, and should further be compatible with current communication protocols such as those for the transmission of television signals. The present invention provides a system having the above and other advantages.

SUMMARY OF THE INVENTION

In accordance with the present invention, an apparatus and method are presented for providing information resources, such as those that are available over the Internet, via a broadcast channel.

In particular, a method is presented for mapping a command having a uniform resource locator (URL) syntax to an address of a broadcast signal. A user request signal having an associated URL command is received. The user request signal is a signal which is generated based on an input from a user. The user input may be provided, for example, with a mouse or other pointing device, a keyboard, or an infrared remote control or the like which is used in conjunction with a television. For example, a user may select a button which appears on a television screen to provide the user request signal for viewing a particular page. A broadcast address which is determined according to the URL command indicates a location in the broadcast signal from which the requested information can be retrieved.

The broadcast address may provide information regarding a frequency, packet identifier, satellite identifier and/or location, transponder, cryptographic scheme, modulation scheme, data rate, error correction scheme, page number, or other relevant criteria which must be known to retrieve the requested information. The requested information is then retrieved and processed to provide a video signal suitable for display on a television. The requested information may be represented by a hypertext markup language (HTML), and may comprise a plurality of HTML pages which are linked according to at least one hyperlink.

Moreover, the broadcast address may be determined according to the URL command of the user request signal using URL mapping table data which is carried in the broadcast signal. Thus, the mapping table data is used to determine the appropriate broadcast address based on the URL command of the user request signal. Furthermore, updated mapping table data may be provided in the broadcast signal to account for changes in information which is available to the user. The mapping table data may be transmitted continuously or intermittently.

A corresponding apparatus is also presented.

A decoder is also presented for processing a broadcast signal which carries programming service data which is represented by a URL syntax and table mapping data to provide a signal suitable for display on a television. The decoder includes first means for retrieving the programming service data, second means for retrieving the table mapping data, and third means for retrieving the data which is represented by a URL syntax, according to the table mapping data and a user request signal. Additionally, fourth means are provided for processing the requested data to provide a signal suitable for display on a television.

DETAILED DESCRIPTION OF THE INVENTION

A method and apparatus are presented for retrieving information from a broadcast data signal in response to a user request signal which is defined according to a Uniform Resource Locator (URL) syntax.

As mentioned, a URL typically defines three things: a communication protocol, a logical access path to be used by that protocol, and the name of an object. Example object types include bitmap images, other HTML pages, and files of virtually any type or format. The following is an example of a script for an HTML page:

<HTML><HEAD>
<TITLE>Michael Field Home Page</TITLE>
</HEAD><BODY><P>This is a test
<P><IMG SRC="gi.gif" ALIGN="Middle" WIDTH="495" HEIGHT="79">
<P><HR>
<P><A HREF="http://giweb/hpage.html">LINK</A>
</BODY></HTML>

The term "gi.gif" specifies the source attribute of an inline image. That is, gi.gif is a URL of a file which contains the image to be imbedded into a page. The term "http://giweb/hpage.html" specifies a hyperlink to another HTML page of information. The term specifies the protocol to be used to communicate with a server (e.g., http:), the name of the destination server (e.g., giweb) and the page of information within that server which is hyperlinked (e.g., hpage.html). There are several variations of the form of a URL, but they all refer to a server and the information within the server that is to be accessed.

Figure 2:
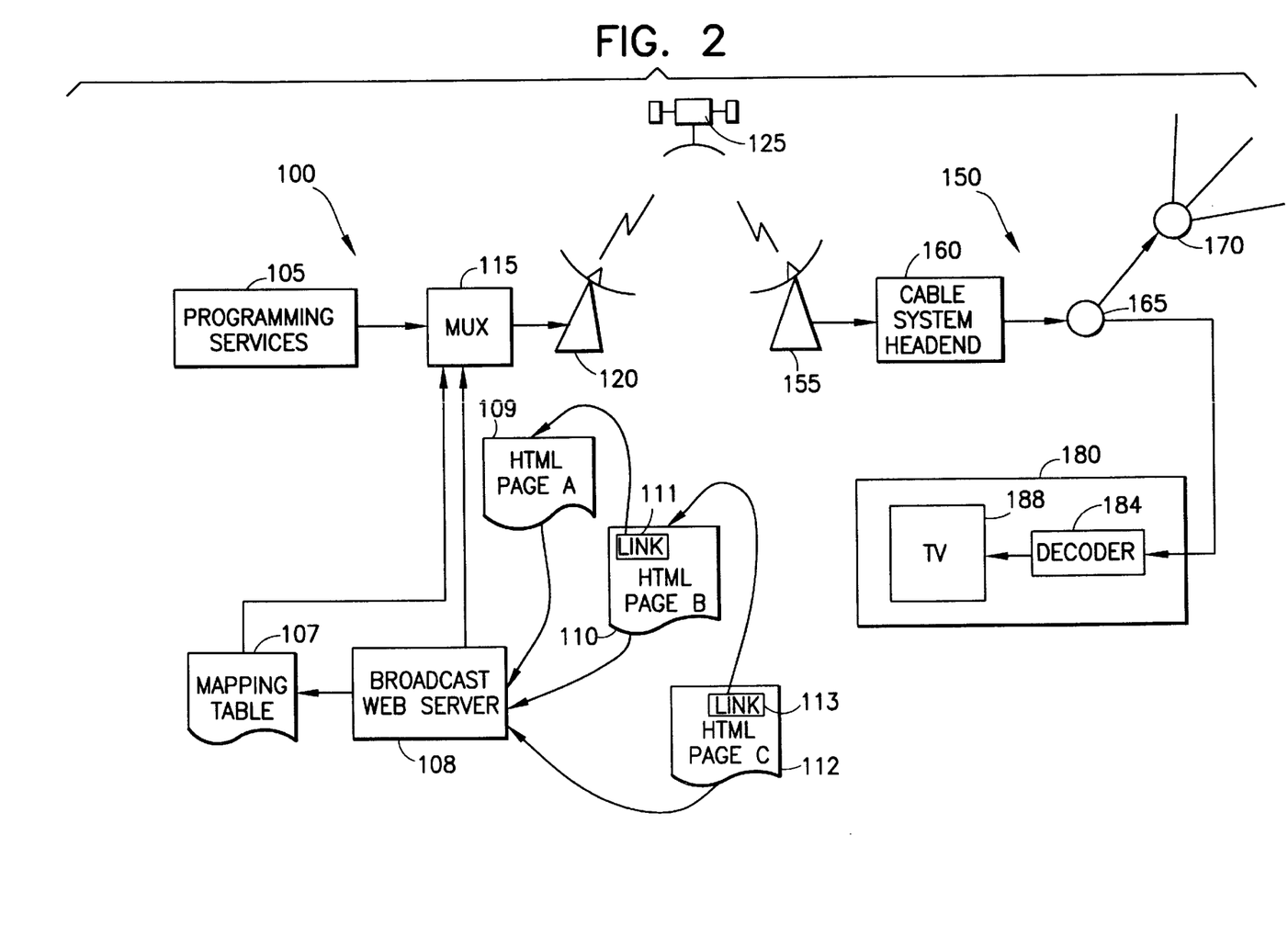
FIG. 2 is a block diagram of a television broadcast system in accordance with the present invention.

FIG. 2 is a block diagram of a television broadcast system in accordance with the present invention. The system includes a transmitter side, shown generally at 100, and a receiving side, shown generally at 150. The transmitting side 100 includes a programming services function 105, which comprises video and audio programming services from network television stations and the like. The programming services audio/video data, which may be carried as digital data is provided to a multiplexer ("mux") 115. The multiplexer 115 also receives mapping table data from a mapping table function 107 and HTML page data from a broadcast web server 108.

The programming services data, HTML page data, and mapping table data are multiplexed at the multiplexer 115 to provide a broadcast signal to a transmitting antenna 120. The transmitting antenna transmits the broadcast signal to a receiving antenna 155 via a satellite 125. The signal may be carried as a packetized digital transport stream which conforms to, for example, the Moving Pictures Experts Group-2 (MPEG-2) standard.

The broadcast signal is provided to a cable television (CATV) system headend 160, where the data may be processed for distribution to cable system customers. For example, various decryption/encryption and scrambling/descrambling operations may take place. Additionally, insertion of local commercials and programming may occur. Moreover, at the cable system headend 160, it is possible to provide a broadcast server (not shown) in addition to, or in lieu of, the broadcast server 108. Alternatively, the transport stream may be broadcast directly to the user via a direct broadcast satellite system, multiple microwave distribution system, or the like.

The cable system headend 160 distributes the broadcast signal to subscribers via representative hubs 165 and 170, and spokes as shown. At a subscriber's home 180, a decoder 184 receives the broadcast signal, decodes it as required, and provides an audio and video signal for reproduction on a television 188 or similar video display appliance. Furthermore, the HTML page data may be retrieved and processed for display on the television according to the mapping data and a user request signal.

In particular, the broadcast web server 108 receives HTML page data from HTML page A 109, HTML page B 110, and HTML page C 112. In a schematic representation, HTML page C 112 includes a hyperlink 113 for linking to HTML page B 110, and HTML page B 110 includes a hyperlink 111 for linking to HTML page A 109. The broadcast web server 108 processes the HTML pages by assigning packet addresses to identify locations within the multiplexed broadcast signal in which the HTML pages are carried.

For example, HTML page A 109 may have the URL "http://giweb/pageA.html," while HTML page B 110 has the URL "http://giweb/pageB.html", and HTML page C 112 has the URL "http://giweb/pageC.html". Then, the broadcast web server 108 will assign a packet identifier (PID) "PID 1" to HTML page A 109, "PID 2" to HTML page B 110, and "PID 3" to HTML page C 112.

Moreover, the broadcast web server 108 will assign the same PID to successive packets of a particular HTML page, and will forward the HTML page data and the associated PIDs to the multiplexer 115. Additionally, the broadcast web server 108 will provide the PID and URL information to the mapping table function 107 which will create a URL mapping table that contains the mapping information that HTML pages A, B and C are being sent on PIDs 1, 2 and 3 respectively. The mapping table function 107 then forwards the mapping table data to the multiplexer 115 for transmission in the broadcast signal. Note that the page data may be identified by some notation other than a URL. If so, the appropriate identifying data is incorporated into the mapping table and transmitted in the broadcast signal.

When the transport stream conforms to an MPEG or similar protocol, the address of the HTML page data may comprise one or more PIDs. However, this form of addressing can be augmented by adding sub-address information to the broadcast address to reference a smaller portion or sub-layer of the broadcast signal. For example, a sub-address may include a "table_id" term which identifies a particular portion of the broadcast spectrum.

By providing table mapping data that maps a URL or other identifier of an HTML page to another form of address which identifies a location in a broadcast signal, it is possible to retrieve the HTML page corresponding to a user request signal. In addition to PIDs, the broadcast address may include other information such as a satellite identifier, transponder identifier, transmission frequency, page number, or other information required to retrieve the desired information. For example, Table 1 below shows a mapping table in accordance with the present invention. The first column of the table shows a URL of HTML data which is carried in a broadcast signal, and the second column shows the corresponding broadcast address.

TABLE 1

| URL | Broadcast Address |
| --- | --- |
| gi.gif | Satellite = G5, Transponder = 3, PID = 9, Page = 24 |
| http://giweb/pageA.html | Frequency = 78 MHz, PID 9, Page = 36 |

When the programming services, HTML data and table mapping data are carried in an analog transmission, the broadcast address may include a broadcast frequency (e.g., channel) at which the HTML page data is carried.

Moreover, the mapping table data need not be transmitted continuously, but may be delivered to the decoder only as new information is made available or as broadcast addresses change. For example, new information may include new HTML pages and new hyperlinks. Thus, table mapping data which is stored at the decoder 184 may be updated and modified as required. Moreover, the table mapping data may be also be provided to the decoder 184 locally via a smart card or the like. Bandwidth limitations in the transport signal and memory storage capabilities at the decoder 184 may limit the size of the mapping table. However, this should not be a problem since the domain of information that is available to the user will be limited to an amount that the decoder can support.

Figure 3:
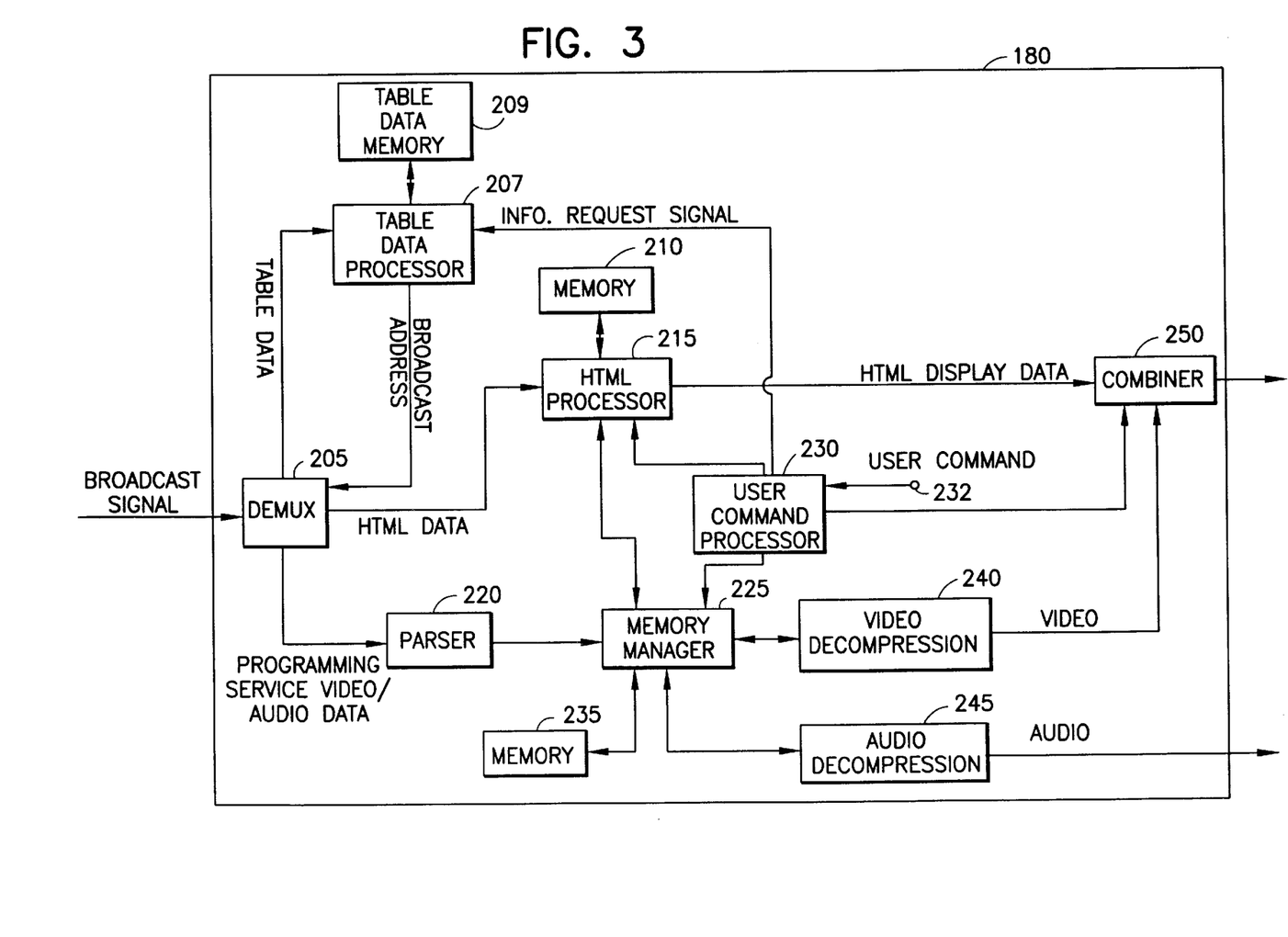
FIG. 3 is a block diagram of a television receiver in accordance with the present invention.

FIG. 3 is a block diagram of a television receiver in accordance with the present invention. The decoder, shown generally at 180, corresponds to the decoder of FIG. 2. As mentioned, the decoder 180 may receive the transport stream from a cable plant, satellite, or terrestrial broadcast. The transport stream is demultiplexed at a demultiplexer 205 to recover the table mapping data, HTML page data and programming service audio/video data. The programming service data is parsed at parser 220 and provided to a memory manager 225. The memory manager, which may include a central processing unit, controls the decoding of the audio and video data by interacting with a video decompression processor 240, an audio decompression processor 245 and a memory 235.

The memory 235, which may comprise a dynamic random access memory (DRAM), is used to temporarily store the video pictures prior to decoding and presentation of the video on the television screen. The video decompression processor 240 provides a variety of processing functions, such as error detection and correction, motion vector decoding, inverse quantization, inverse discrete cosine transformation, Huffman decoding and prediction calculations, for instance. After being processed by the decompression processor 240, the video pictures are output to a combiner 250. Alternatively, the decoded data may be temporarily stored in the memory 235.

The audio decompression processor 245 processes audio data using, for instance, inverse quantization, Huffman decoding, and spectral shaping algorithms.

The memory manager 225 receives commands from a user command processor 230, which, in turn, receives a user command via terminal 232. The user command may be input, for example, by a mouse or other pointing device, a keyboard, or an infrared remote control or the like which is used in conjunction with a television or other video appliance. The user command processor 230 can provide a control signal to the combiner 250, and provides an information ("info.") request signal to a table data processor 207. The memory manager 225 also receives commands from an HTML processor 215.

The table data processor 207 receives the table mapping data from the demultiplexer 205 and stores it in an associated memory 209. The information request signal received by the processor 207 may include a URL of information which a user wishes to retrieve. In accordance with the present invention, the processor 207 looks up the broadcast address which corresponds to the desired URL. For example, referring to a previous example, assume the URL is "http://giweb/pageA.html", and the corresponding broadcast address is "PID 1." Then, the table data processor 207 will provide a broadcast addresss to the demultiplexer 205 to retrieve the HTML data packets which correspond to "PID 1." The selected HTML data packets are then sent from the demultiplexer 205 to the HTML processor 215 for further processing to be discussed below.

Note that while the broadcast address is shown being provided only to a demultiplexer 205, it should be understood that the broadcast address may be provided to one or more components as required to retrieve the corresponding information. For example, the broadcast addresss may specify a frequency which is provided to a demodulator (not shown) for tuning the appropriate frequency. Alternatively, when the broadcast signal is received via a direct broadcast satellite system, the broadcast address may require re-aligning a receiving dish with a different satellite to retrieve the information. In this case, the broadcast address will include commands for positioning the receiving dish which are provided to a servo motor or the like. Furthermore, the broadcast address may define a criteria such as data rate, modulation scheme (e.g., QAM, QPSK), error-correction scheme, and/or encryption scheme which is related to the information to be retrieved, or other systems information or auxiliary table data.

The HTML processor 215, which communicates with a memory 210, receives the HTML which was selected according to the broadcast address from the demultiplexer 205 or other relevant component. The processor 215 may include a central processing unit which implements an HTML-based code which is analogous to a Web browser. The HTML processor also receives commands from the user command processor 230. HTML display data provided by the processor 215 is then provided to the combiner 250, where it may optionally be combined with the video data from processor 240 to produce a graphical display on a television screen.

A user may provide commands to the user command processor 230 in response to a variety of textual and graphical displays which may be displayed on a television screen. For example, the screen may include buttons which define hyperlinks to other HTML pages. The buttons may be selected by the user via a pointing device, infrared remote control, or the like. The buttons may include text and/or graphics, such as icons, which inform and entertain the user. Moreover, the user command processor 230 may provide a signal to the memory manager 225 to provide audio and or video of the programming service in conjunction with, or in lieu of, the HTML display data.

The invention thus allows a user to access information through a broadcast signal rather than through a two-way channel without requiring the format of the information to be changed. This advantageously avoids the burden of converting each page of information into a new, non-standard format before transmission, and reconverting the information when it is received at the decoder.

Generally, by retaining the original form of the user-requested information, such as an HTML page, the same HTML page can be made available to users accessing information through a conventional two-way Internet connection or through a broadcast stream.

In view of the above, it should be appreciated that the present invention provides an apparatus and method for retrieving Web pages and other Internet information resources from a broadcast signal such as a broadcast television signal. The invention allows a user to select from a range of information, including HTML information, which is carried in the broadcast stream by invoking a command which is defined according to a URL format. Table mapping data is carried in the broadcast signal and provides a broadcast address corresponding to the URL of the user request signal to identify a location in the broadcast signal from which the desired information can be retrieved. Thus, although only a one-way communication path is provided from the information provider to the user, the user's perception is that of a bi-directional network that allows Internet-type browsing, colloquially known as "surfing." Moreover, the system is compatible with existing transmission schemes.

Additionally, the invention is compatible with other types of hypermedia besides HTML such as, for example, the hyperlinking scheme used by a MacIntosh® hypercard when accessed in a non-interactive way.

Moreover, the invention is compatible with virtually any type of programming service, including television, information services such as stock prices and weather data, and audio/video programming implemented in software including games and other programming.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for retrieving information identified by a uniform resource locator (URL) from a broadcast signal that is broadcast over a communication network to a decoder, comprising the steps of:

receiving a user command at said decoder designating said URL of said information; and determining a broadcast address of said broadcast signal according to said user command; wherein:

said broadcast address is indicative of a location in said broadcast signal from which said information can be retrieved.

2. The method of claim 1, comprising the further steps of:

retrieving said information from said location of said broadcast signal; and processing said information to provide a video signal suitable for display on a television.

3. The method of claim 1, wherein:

said broadcast address is indicative of a frequency of said broadcast signal.

4. The method of claim 1, wherein:

said broadcast signal comprises a packetized digital data stream; and said broadcast address is indicative of a packet identifier of said packetized digital data stream.

5. The method of claim 1, wherein:

said information is represented by a hypertext markup language.

6. The method of claim 1, wherein:

said information comprises a plurality of pages which are represented by a hypertext markup language, said pages being linked according to at least one hyperlink.

7. The method of claim 1, comprising the further step of:

recovering mapping table data from said broadcast signal; wherein:

said mapping table data maps said URL to said broadcast address.

8. The method of claim 7, comprising the further step of:

providing updated mapping table data in said broadcast signal to account for changes in information which is available to the user.

9. The method of claim 7, wherein: said mapping table data maps a plurality of URLs to a corresponding plurality of broadcast addresses in said broadcast signal.

10. The method of claim 1, wherein:

programming service data is carried with said information in said broadcast signal to a plurality of decoders via said communication network.

11. The method of claim 1, wherein:

the URL designated by the user command is one of a plurality of available URLs that the user may selectively designate, each of which identifies corresponding information that is broadcast in the broadcast signal in locations indicated by corresponding broadcast addresses.

12. A decoder apparatus for retrieving information identified by a uniform resource locator (URL) from a broadcast signal that is broadcast over a communication network to said decoder, comprising:

a user command processor responsive to a user command designating said URL of said information; and a table data processor responsive to said user command processor;

said table data processor determining a broadcast address of said broadcast signal according to said user command; wherein:

said broadcast address is indicative of a location in said broadcast signal from which said information can be retrieved.

13. The apparatus of claim 12, further comprising:

means for retrieving said information from said location of said broadcast signal; and a processor responsive to said retrieving means for processing said information to provide a video signal suitable for display on a television.

14. The apparatus of claim 12, wherein:

said broadcast address is indicative of a frequency of said broadcast signal.

15. The apparatus of claim 12, wherein:

said broadcast signal comprises a packetized digital data stream; and said broadcast address is indicative of a packet identifier of said packetized digital data stream.

16. The apparatus of claim 12, wherein:

said information is represented by a hypertext markup language.

17. The apparatus of claim 12, wherein said information comprises a plurality of pages which are represented by a hypertext markup language, said pages being linked according to at least one hyperlink.

18. The apparatus of claim 12, wherein:

said table data processor is responsive to said user command processor for recovering mapping table data from said broadcast signal; and said mapping table data maps said URL to said broadcast address.

19. The apparatus of claim 18, wherein:

updated mapping table data is provided in said broadcast signal to account for changes in information which is available to the user.

20. The apparatus of claim 18, wherein:

said mapping table data maps a plurality of URLs to a corresponding plurality of broadcast addresses in said broadcast signal.

21. The apparatus of claim 12, wherein:

programming service data is carried with said information in said broadcast signal to a plurality of decoders via said communication network.

22. The apparatus of claim 12, wherein:

the URL designated by the user command is one of a plurality of available URLs that the user may selectively designate, each of which identifies corresponding information that is broadcast in the broadcast signal in locations indicated by corresponding broadcast addresses.

23. A method for providing information identified by a uniform resource locator (URL) in a broadcast signal that is broadcast over a communication network to a decoder, comprising the steps of:

providing mapping table data that maps a broadcast address of said broadcast signal to said URL;

said broadcast address indicating a location in said broadcast signal from which said information can be retrieved; and broadcasting said mapping table data with said information in said broadcast signal to said decoder.

24. The method of claim 23, wherein:

said mapping table data is adapted to be recovered by said decoder for use in recovering said information in response to a user command at said decoder designating said URL of said information.

25. The method of claim 23, wherein:

said information is adapted to provide a video signal suitable for display on a television.

26. The method of claim 23, wherein:

said broadcast address is indicative of a frequency of said broadcast signal.

27. The method of claim 23, wherein:

said broadcast signal comprises a packetized digital data stream; and said broadcast address is indicative of a packet identifier of said packetized digital data stream.

28. The method of claim 23, wherein:

said information is represented by a hypertext markup language.

29. The method of claim 23, wherein:

said information comprises a plurality of pages which are represented by a hypertext markup language, said pages being linked according to at least one hyperlink.

30. The method of claim 23, comprising the further step of:

providing updated mapping table data in said broadcast signal to account for changes in information that is available to the user.

31. The method of claim 23, wherein:

programming service data is carried with said information in said broadcast signal to a plurality of decoders via said communication network.

32. The method of claim 23, wherein:

said mapping table data maps a plurality of URLs to a corresponding plurality of broadcast addresses in said broadcast signal.

33. The method of claim 23, comprising the further steps of:

providing programming service data together with said information in said broadcast signal.

34. The method of claim 23, wherein:

the mapping table data maps a plurality of broadcast addresses to corresponding available URLs, each of which identifies corresponding information that is broadcast in the broadcast signal in locations indicated by the broadcast addresses thereof.

35. An apparatus for providing information identified by a uniform resource locator (URL) in a broadcast signal that is broadcast over a communication network to a decoder, comprising:

means for providing mapping table data that maps a broadcast address of said broadcast signal to said URL;

said broadcast address indicating a location in said broadcast signal from which said information can be retrieved; and means for broadcasting said mapping table data with said information in said broadcast signal to said decoder.

36. The apparatus of claim 35, wherein:

said mapping table data is adapted to be recovered by said decoder for use in recovering said information in response to a user command at said decoder designating said URL of said information.

37. The apparatus of claim 35, wherein:

said information is adapted to provide a video signal suitable for display on a television.

38. The apparatus of claim 35, wherein:

said broadcast address is indicative of a frequency of said broadcast signal.

39. The apparatus of claim 35, wherein:

said broadcast signal comprises a packetized digital data stream; and said broadcast address is indicative of a packet identifier of said packetized digital data stream.

40. The apparatus of claim 35, wherein:

said information is represented by a hypertext markup language.

41. The apparatus of claim 35, wherein:

said information comprises a plurality of pages which are represented by a hypertext markup language, said pages being linked according to at least one hyperlink.

42. The apparatus of claim 35, wherein:

said mapping table function provides updated mapping table data in said broadcast signal to account for changes in information that is available to the user.

43. The apparatus of claim 35, wherein:

programming service data is carried with said information in said broadcast signal to a plurality of decoders via said communication network.

44. The apparatus of claim 35, wherein:

said mapping table data maps a plurality of URLs to a corresponding plurality of broadcast addresses in said broadcast signal.

45. The apparatus of claim 35, further comprising:

means for combining said information and programming service data together in said broadcast signal.

46. The apparatus of claim 35, wherein:

the mapping table data maps a plurality of broadcast addresses to corresponding available URLs, each of which identifies corresponding information that is broadcast in the broadcast signal in locations indicated by the broadcast addresses thereof.

47. A decoder apparatus for retrieving information identified by a uniform resource locator (URL) from a broadcast signal that is broadcast over a communication network to said decoder, comprising:

user command processing means responsive to a user command designating said URL of said information; and table data processing means responsive to said user command processing means for determining a broadcast address of said broadcast signal according to said user command; wherein:

said broadcast address is indicative of a location in said broadcast signal from which said information can be retrieved.

48. The apparatus of claim 47, further comprising:

means for retrieving said information from said location of said broadcast signal; and processing means responsive to said retrieving means for processing said information to provide a video signal suitable for display on a television.

49. The apparatus of claim 47, wherein:

said broadcast address is indicative of a frequency of said broadcast signal.

50. The apparatus of claim 47, wherein:

said broadcast signal comprises a packetized digital data stream; and said broadcast address is indicative of a packet identifier of said packetized digital data stream.

51. The apparatus of claim 47, wherein:

said information is represented by a hypertext markup language.

52. The apparatus of claim 47, wherein:

said information comprises a plurality of pages which are represented by a hypertext markup language, said pages being linked according to at least one hyperlink.

53. The apparatus of claim 47, wherein:

said table data processing means is responsive to said user command processing means for recovering mapping table data from said broadcast signal; and said mapping table data maps said URL to said broadcast address.

54. The apparatus of claim 53, wherein:

updated mapping table data is provided in said broadcast signal to account for changes in information which is available to the user.

55. The apparatus of claim 53, wherein:

said mapping table data maps a plurality of URLs to a corresponding plurality of broadcast addresses in said broadcast signal.

56. The apparatus of claim 47, wherein:

programming service data is carried with said information in said broadcast signal to a plurality of decoders via said communication network.

57. The apparatus of claim 47, wherein:

the URL designated by the user command is one of a plurality of available URLs that the user may selectively designate, each of which identifies corresponding information that is broadcast in the broadcast signal in locations indicated by corresponding broadcast addresses.

58. A broadcast signal carried in a communication network from a headend to a decoder, comprising:

an information portion identified by a uniform resource locator (URL); and a mapping table data portion that maps a broadcast address of said broadcast signal to said URL; wherein:

said broadcast address indicates a location in said broadcast signal from which said information can be retrieved.

59. The broadcast signal of claim 58, wherein:

said mapping table data portion is adapted to be recovered by said decoder for use in recovering said information in response to a user command at said decoder designating said URL of said information.

60. The broadcast signal of claim 58, wherein:

said information portion is adapted to provide a video signal suitable for display on a television.

61. The broadcast signal of claim 58, wherein:

said broadcast address is indicative of a frequency of said broadcast signal.

62. The broadcast signal of claim 58, wherein:

said broadcast signal comprises a packetized digital data stream; and said broadcast address is indicative of a packet identifier of said packetized digital data stream.

63. The broadcast signal of claim 58, wherein:

said information portion is represented by a hypertext markup language.

64. The broadcast signal of claim 58, wherein:

said information portion comprises a plurality of pages which are represented by a hypertext markup language, said pages being linked according to at least one hyperlink.

65. The broadcast signal of claim 58, wherein:

said mapping table data portion provides updated mapping table data in said broadcast signal to account for changes in information that is available to the user.

66. The broadcast signal of claim 58, wherein:

said broadcast signal is a broadcast television signal that is broadcast to a plurality of decoders.

67. The broadcast signal of claim 58, wherein:

said mapping table data portion maps a plurality of URLs to a corresponding plurality of broadcast addresses in said broadcast signal.

68. The broadcast signal of claim 58, further comprising:

programming service data.

69. The broadcast signal of claim 58, wherein:

the mapping table data portion maps a plurality of broadcast addresses to corresponding available URLS, each of which identifies corresponding information that is broadcast in locations indicated by the broadcast addresses thereof.

* * * * *